United States Patent
Bai

(10) Patent No.: US 8,409,392 B2
(45) Date of Patent: Apr. 2, 2013

(54) METHOD OF MANUFACTURING ULTRA-THIN AND ELASTIC KEYPAD

(75) Inventor: Yisong Bai, Guangdong (CN)

(73) Assignees: Dongguan Memtech Electronic Products Co., Ltd., Dongguan, Guangdong (CN); Memtech International Ltd., Ang Mo Kio (SG)

( * ) Notice: Subject to any disclaimer, the term of this patent is extended or adjusted under 35 U.S.C. 154(b) by 119 days.

(21) Appl. No.: 12/306,645

(22) PCT Filed: Dec. 17, 2007

(86) PCT No.: PCT/CN2007/071250
§ 371 (c)(1),
(2), (4) Date: Apr. 5, 2011

(87) PCT Pub. No.: WO2009/076794
PCT Pub. Date: Jun. 25, 2009

(65) Prior Publication Data
US 2012/0128887 A1    May 24, 2012

(51) Int. Cl.
 B32B 37/02 (2006.01)
 B32B 65/02 (2006.01)
 B32B 38/04 (2006.01)
 B05D 3/00 (2006.01)

(52) U.S. Cl. .......... 156/256; 156/84; 156/251; 156/263; 156/211; 427/290; 427/421.1

(58) Field of Classification Search ............... 156/84, 156/252, 257, 268, 263, 211; 427/290, 421.1
See application file for complete search history.

(56) References Cited

U.S. PATENT DOCUMENTS

| 6,423,171 B1 * | 7/2002 | Yang | 156/245 |
| 2009/0236209 A1 * | 9/2009 | Ishii | 200/341 |
| 2011/0164910 A1 * | 7/2011 | Ando et al. | 400/472 |
| 2011/0290401 A1 * | 12/2011 | Kato et al. | 156/92 |

* cited by examiner

*Primary Examiner* — Linda L Gray

(57) ABSTRACT

The present invention pertains to a method of manufacturing ultra-thin and elastic keypad, especially comprising the processing of the elastic film, silicone adhesive, and plastic film. Wherein, the present method simply takes advantage of the steps of printing, oil pressing, and trimming to easily finish the keypad, which favorably avoids the complex process of spraying P+R, deviation from the forming of IMD products, and defectiveness of spraying and cutting applied on silicone products. Manifestly, the present invention simplifies the intricate processes, and only oil-pressing die and punching die are involved, namely less equipment and fewer personnel as well as places are required. Therefore, the present invention is uncomplicated and low-cost.

5 Claims, 1 Drawing Sheet

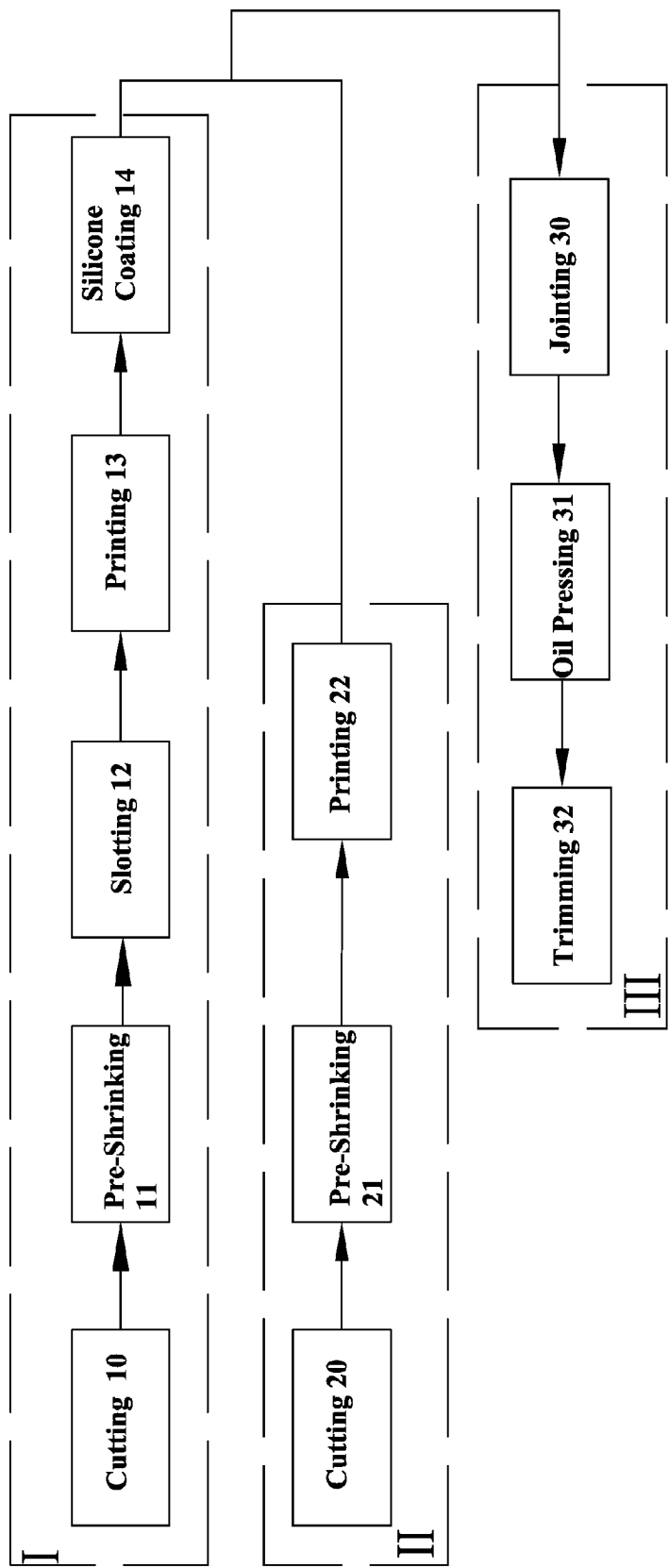

METHOD OF MANUFACTURING ULTRA-THIN AND ELASTIC KEYPAD

BACKGROUND OF THE INVENTION

1. Field of the Invention

The present invention relates to a keypad processing, in particular to method of manufacturing ultra-thin and elastic keypad that consists of elastic-film, silicone, and plastic film.

2. Description of the Related Art

Nowadays, it is a trend to pursue high-difficult technology with remarkable design in the cell phone industry in response to consumer's desire. Therefore, a variety of cell phone products is constantly promoted by dealers. Herein, those low-priced and high-beneficial cell phones are especially popular among consumers and sustainable sold.

Wherein, the keypad is a vital part of the cell phone. However, the conventional keypad is generally heavier; namely, the entire thickness after assembling the keypad with the bottom silicone is about 4 mm or thicker. As a result, the finished cell phone is bulky and unfavorable for carrying.

For remedying the above shortcomings, sorts of plastic materials, such as the combination of TPU (Thermoplastic Urethane), PC (Polycarbonate), and silicone, are commonly applied in producing light, thin, and elastic keypads. The processes conforming to the preceding materials are the conventional spraying process of P+R (plastic+rubber), IMD (In Mold Decoration), or spraying and cutting the silicone products. Obviously, the conventional processes are complex with high costs, a high defective ratio, and a weak competitiveness in the market.

SUMMARY OF THE INVENTION

The object of the present invention is to provide a method of manufacturing ultra-thin and elastic keypad with simple producing procedures and low costs.

The method of manufacturing ultra-thin and elastic keypad in accordance with the present invention mainly comprises:

I. steps for forming a plastic-film flake:
  a. cutting: a plastic film is cut into an initial plastic-film flake after being slit by auto cutting machines;
  b. pre-shrinking: the cut plastic-film flake is pre-shrunk;
  c. slotting: a plurality of printing-fixing slots are slotted on the pre-shrunk plastic-film flake while placing into a punch;
  d. printing: an adhesive is sprayed after patterns or characters are printed on the obverse of the slotted plastic-film flake;
  e. silicone coating: the adhesive on the plastic-film flake is coated by silicone, and the production of an integral plastic-film flake is finished;

II. steps for forming an elastic-film flake:
  a. cutting: an elastic film is cut into an initial elastic-film flake after being slit by auto cutting machines;
  b. pre-shrinking: the cut elastic-film flake is pre-shrunk;
  c. printing: an adhesive is sprayed on the reverse of the pre-shrunk elastic-film flake, and the production of an integral elastic-film flake is finished; and III. steps for forming a keypad production:
  a. preparation: the processed plastic- and elastic-film flakes are prepared;
  b. jointing: the plastic-film flake with its silicone-coated surface is adhered to the elastic-film flake with its adhesive-printed surface;
  c. oil pressing: the jointed flake is pressed by a preheated oil pressing equipment at a designated temperature to form a pressed flake;
  d. trimming: the pressed flake is trimmed by a punch.

A sequence of a black keymats, a metallic sputtering for multiple metallic colors, a black printing serving as a foil to the metallic colors, a stripping, and then a background color spraying can be alternatively processed during the aforementioned printing step (d) for forming the plastic-film flake, and the obverse of the elastic-film flake is a glossy surface. As a result, the present invention makes good use of the steps of printing, oil pressing, and trimming to easily finish the keypad, which favorably needs not the complex processes of spraying P+R and prevents the deviation of the integrities of IMD products as well as the poor defectiveness attendant on spraying and cutting applied to silicone products. Manifestly, the present invention streamlines the complex processing and merely requires the applications of an oil-pressing die and a punching die to assist the production. Accordingly, the objectives of less equipment and fewer manufacturing costs are attained.

The advantages of the present invention over the known prior arts will become more apparent to those of ordinary skilled in the art by reading the following descriptions with the relating drawings.

BRIEF DESCRIPTION OF THE DRAWINGS

FIG. 1 is a flow diagram showing the method of the present invention.

DETAILED DESCRIPTION OF THE PREFERRED EMBODIMENTS

Before describing in greater detail, it should note that the like elements are denoted by the similar reference numerals throughout the disclosure.

Referring to FIG. 1 showing a method of manufacturing ultra-thin and elastic keypad mainly comprises the following steps:

I. steps for forming a plastic-film flake with PC film as an example:

Cutting 10: a thick PC plastic is slit into a strip condition by an auto cutting machine and thence cut into a PC plastic-film flake by another auto cutting machine to facilitate the subsequent procedures.

Pre-shrinking 11: the PC plastic-film flake is pre-shrunk to increase a surface adhesion thereof and maintain a printing ink, so that the product would not deform and deviate from its estimated standard while being exposed to a high temperature. That is to say, though all substances possess the expansion and contraction (expand when heated and contract when cooled), the pre-shrinking step issuing from the method of the present invention can preferably preclude the printed product from the possibility of serious deviation, promote the quality ratio, decrease the costs, and increase the profit margin.

Slotting 12: a plurality of printing-fixing slots is slotted upon the pre-shrunk PC plastic-film flake. Wherein, the film could be merely placed within the range of a punch, rather than precisely placed. In view of the formation of the slots within the flake, the occurrence of the deviation thereof would not exit in the subsequent printing.

Printing 13: after slotting, a sequence of a black keymats, a metallic sputtering for multiple metallic colors, a gland oil printing, a black printing serving as a foil to the metallic color, a stripping, and then a background coloring can be plated on the reverse of the plastic-film flake; then, after patterns or characters are printed on the obverse of the PC plastic-film flake, an adhesive is applied. Wherein, the application of the black keymat is to facilitate the shading of the keypad and to depict a front black performance that leaves hollow characters accompanying strips and a ring part surrounding a joystick with respect to client requirements. Moreover, the sputtering step is mainly to process a metal layer, such as aluminum, on the strips of the plastic film for rendering a premium metallic impression. In addition, the process of gland oil printing could cover the ring part to avoid stripping thereof. Further, the process of black printing not only serves to be a foil to the metal layer (aluminum) to far more embellish that the brightness of the spluttered metal layer (aluminum)when in the frontal view but also to protect the gland oil and the cladding on the layer. The process of stripping is mainly to erode and dissolve all parts of the film except the ring. White printing is to print the characters white and put on various light-colors in response to clients¡¯ requirements. Furthermore, as the silicone and the plastic film cannot be directly combined, the adhesive should be accordingly applied to adhere to the obverse of the PC plastic-film flake to the silicone.

Silicone coating 14: the adhesive on the obverse of the PC plastic-film flake is coated by a silicone and is flattened by a scraper, and the processing of the PC plastic-film flake is accomplished.

II. steps for forming an elastic-film flake with TPU material as an example:

Cutting 20: a TPU film, of which the obverse attached with a membrane performs in a glossy surface, is chosen. Sequentially, the TPU film with a certain thickness could be cut into a TPU-film flake after being slit by auto cutting machines. Herein, the cutting process 20 is the same as that of the formation of the plastic-film flake (I) and therefore omitted.

Pre-shrinking 21: the cut TPU-film flake is pre-shrunk. Herein, the object of pre-shrinking 21 is the same as that of the formation of the plastic-film flake and hence abridged.

Printing 22: an adhesive is used on the reverse of the pre-shrunk TPU-film flake, so as to connect the TPU film flake with the silicone, and the processing of the TPU-film flake is finished.

III. steps for forming a keypad production:

Preparation: the aforementioned processed PC- and TPU-film flakes are prepared. As it should be, the order of processing the PC- and TPU-film flakes can be exchangeable or simultaneous.

Jointing 30: the PC-film flake with its silicone-coated surface is combined with the TPU-film flake with its adhesive-printed surface, and this step can be in a manual process.

Oil Pressing 31: the jointed flakes are pressed by oil pressing equipment when preheating at a designate temperature. Wherein, the die is preheated to the predetermined temperature before executing the oil pressing, and then the jointed PC- and TPU-film flakes are slipped over the printing-fixing slot via an oil-pressing-fixing slot so as to peel the membrane on the obverse of the TPU film off. Then, the die can be closed and injected so as to automatically forming the film under the hot pressing of the oil pressing equipment. Different patterns can be configured by diverse dies with assorted pattern designs on the exterior surface of the integral formation. For example, solid figures, such as flowers, personages, buildings, and so on, can be achieved by combining various printed patterns. Briefly, the appearances and performances of the ultra-thin keypad can be altered according to clients¡¯ demands.

Trimming 32: a designated punched is used to prune an ragged edge on the pressed flakes, so as to accomplish an integral keypad product of the present invention.

While we have shown and described the embodiment in accordance with the present invention, it should be clear to those skilled in the art that further embodiments may be made without departing from the scope of the present invention.

I claim:

1. A method of manufacturing ultra-thin and elastic keypad comprising:
    I. steps for forming a plastic flake:
        a. cutting: a plastic film cut into a plastic flake by auto cutting machines;
        b. pre-shrinking: said cut plastic flake being pre-shrunk;
        c. slotting: a plurality of printing-fixing slots being slotted on said pre-shrunk plastic flake while placing within a punch;
        d. printing: an adhesive being sprayed after patterns or characters being printed on an obverse of said slotted plastic flake;
        e. silicone coating: said adhesive on said plastic flake being coated by silicone so as to form a silicone-coated surface, and the processing of said plastic flake being finished;
    II. steps for forming an elastic flake:
        a. cutting: an elastic film cut into an elastic flake by auto cutting machines;
        b. pre-shrinking: said cut elastic flake being pre-shrunk;
        c. printing: an adhesive being sprayed on a reverse of said pre-shrunk elastic flake to form an adhesive-printed surface; and
    III. steps for forming keypad:
        a. preparation: said finished plastic flake and elastic flake being prepared;
        b. jointing: said silicone-coated surface of said plastic flake being adhered to said adhesive-printed surface of said elastic flake;
        c. oil pressing: said jointed flakes being pressed by a preheated oil pressing equipment at a designate temperature;
        d. trimming: said pressed flakes being trimmed by a punch so as to form an integral keypad product.

2. The method of manufacturing ultra-thin and elastic keypad as claimed in claim 1, during said printing step (d) of forming said plastic flake,
    applying to said plastic flake a metallic sputtering for multiple metallic colors, and a black printing serving as a foil to said metallic colors, followed by
    a stripping, and then
    a spraying of a background color.

3. The method of manufacturing ultra-thin and elastic keypad as claimed in claim 1, wherein, the obverse of said elastic flake is a glossy surface.

4. The method of manufacturing ultra-thin and elastic keypad as claimed in claim 1 or 2 or 3, wherein, the material of said elastic-film is thermoplastic urethane.

5. The method of manufacturing ultra-thin and elastic keypad as claimed in claim 1 or 2 or 3, wherein, the material of said plastic-film is polycarbonate.

* * * * *